(12) United States Patent
Swann et al.

(10) Patent No.: US 10,371,003 B2
(45) Date of Patent: Aug. 6, 2019

(54) AIRCRAFT VAPOUR TRAIL CONTROL SYSTEM

(71) Applicant: ROLLS-ROYCE plc, London (GB)

(72) Inventors: Peter Swann, Nottingham (GB); Andrew M Rolt, Derby (GB); Paul Fletcher, Rugby (GB)

(73) Assignee: ROLLS-ROYCE plc, London (GB)

( * ) Notice: Subject to any disclaimer, the term of this patent is extended or adjusted under 35 U.S.C. 154(b) by 433 days.

(21) Appl. No.: 15/163,318

(22) Filed: May 24, 2016

(65) Prior Publication Data
US 2016/0376918 A1   Dec. 29, 2016

(30) Foreign Application Priority Data

Jun. 22, 2015  (GB) .................................. 1510906.9

(51) Int. Cl.
| | |
|---|---|
| *F01D 21/00* | (2006.01) |
| *F02C 3/04* | (2006.01) |
| *F02C 7/22* | (2006.01) |
| *F02K 3/06* | (2006.01) |
| *B64D 27/24* | (2006.01) |

(Continued)

(52) U.S. Cl.
CPC .......... *F01D 21/003* (2013.01); *B64C 21/025* (2013.01); *B64C 23/065* (2013.01); *B64D 27/18* (2013.01); *B64D 27/24* (2013.01); *F01D 15/10* (2013.01); *F01D 17/24* (2013.01); *F02C 3/04* (2013.01); *F02C 7/22* (2013.01); *F02K 3/06* (2013.01); *F02K 3/075* (2013.01); *B64D 2027/026* (2013.01); *F05D 2220/323* (2013.01);

(Continued)

(58) Field of Classification Search
None
See application file for complete search history.

(56) References Cited

U.S. PATENT DOCUMENTS

| | | | | |
|---|---|---|---|---|
| 4,572,667 A | * | 2/1986 | Rogers | ...................... G01P 5/26 |
| | | | | 250/461.1 |
| 5,285,256 A | * | 2/1994 | Nelson | ..................... G01S 17/88 |
| | | | | 340/945 |

(Continued)

FOREIGN PATENT DOCUMENTS

| | | |
|---|---|---|
| EP | 2 184 480 A2 | 5/2010 |
| GB | 1506275 A | 4/1978 |

OTHER PUBLICATIONS

Haglind, Fredrik. Potential of lowering the contrail formation of aircraft exhausts by engine re-design. 2008. Aerospace Science and Technology 12 (2008) 490-497. (Year: 2008).*

(Continued)

*Primary Examiner* — Scott J Walthour
(74) *Attorney, Agent, or Firm* — Oliff PLC

(57) ABSTRACT

The invention concerns an aircraft propulsion system having an engine core within which fuel is combusted to produce an exhaust containing water produced from the combustion of fuel, at least one propulsive fan for generating a mass flow of air which mixes with the exhaust of the engine core, and one or more sensor arranged to sense a condition indicative of vapor trail formation by the exhaust flow from the engine; and a controller arranged to control the ratio of the mass flow of water in the exhaust to the mass flow of air propulsed by the propulsive fan such that the ratio is reduced upon sensing of said condition by the one or more sensor.

17 Claims, 7 Drawing Sheets

(51) Int. Cl.
  *B64D 27/18* (2006.01)
  *F02K 3/075* (2006.01)
  *B64C 21/02* (2006.01)
  *B64C 23/06* (2006.01)
  *F01D 15/10* (2006.01)
  *F01D 17/24* (2006.01)
  *B64D 27/02* (2006.01)

(52) U.S. Cl.
  CPC .... *F05D 2260/42* (2013.01); *F05D 2270/306* (2013.01)

(56) References Cited

U.S. PATENT DOCUMENTS

| | | | | |
|---|---|---|---|---|
| 5,546,183 A * | 8/1996 | Fegley | ............... | G01N 15/0205 356/336 |
| 8,406,465 B1 * | 3/2013 | Garrett | ................... | G06K 9/00 382/103 |
| 2008/0072577 A1 * | 3/2008 | Taylor | ................... | F01D 25/32 60/295 |
| 2010/0132330 A1 * | 6/2010 | Noppel | ................... | F01D 25/30 60/39.5 |
| 2013/0094963 A1 | 4/2013 | Rolt | | |
| 2013/0340834 A1 * | 12/2013 | Swann | ................... | F02C 3/30 137/2 |

OTHER PUBLICATIONS

Schumann, Ulrich. Influence of propulsion efficiency on contrail formation. 2000. Aerospace Science and Technology 4 (2000) 391-401. (Year: 2000).*

Dec. 18, 2015 Search Report issued in British Patent Application No. GB1510906.9.

Noppel; "Contrail and Cirrus Cloud Avoidance Technology;" Cranfield University, School of Mechanical Engineering; Oct. 2007; https://dspace.lib/cranfield.ac.uk/bitstream/1826/2966/1/Noppel%25202007.pdf.

* cited by examiner

AIRCRAFT VAPOUR TRAIL CONTROL SYSTEM

BACKGROUND OF THE INVENTION

The present invention relates to aircraft propulsion systems and apparatus and methods for aiding the prevention of the formation of contrails particularly for a propulsion system incorporating distributed propulsion.

Contrails, also known as condensation trails or vapour trails, are line-shaped ice-clouds that appear behind aircraft under certain circumstances. The formation of a contrail depends on a number of factors, including: ambient temperature, humidity and pressure; the efficiency of the aircraft's engines; and the properties of the fuel burned in the engines.

During the day, contrails reflect a proportion of incoming sunlight away, leading to a climate cooling effect which is at least partially offset against the climate-warming impact associated with the absorption by contrails of heat radiating upward from the planet's surface. During the night, however, the cooling effect is not operative. For this reason a contrail's climate warming impact (per unit time of contrail existence) is typically greater during the night than during the day. It is estimated that, globally, night-time flying accounts for some 40% of total flying miles, but for some 60% of aviation's total contrail-related climate warming impact. The climate warming impact of a contrail is also influenced by its temperature such that a contrail forming in colder air will exert more of a climate warming effect than an otherwise equivalent contrail which forms in slightly warmer air.

A contrail, once formed, will typically dissipate within a minute or so, unless the ambient air is supersaturated with respect to ice, in which case the contrail may persist. A persistent contrail may grow over time to resemble natural cirrus cloud, both in size and optical properties, and is then referred to as "contrail-cirrus". Line-shaped contrails and contrail-cirrus are collectively referred to as "aviation-induced cloudiness" (AIC). Contrail-cirrus is thought to cause a majority of the negative climate impact of AIC due to it being spatially larger and longer-lived relative to a non-persistent line-shaped contrail.

Depending on the metric employed, the climate-warming impact of aviation-induced cloudiness may be of a similar magnitude to that of the carbon dioxide ($CO_2$) emitted by aircraft, and may therefore represent a significant element of aviation's total climate impact. The suppression of contrail formation, and particularly the suppression of persistent contrails, may represent an opportunity for a significant reduction in the overall climate warming impact of aviation.

However a number of potential techniques for reduction of contrail formation by a gas turbine engine require the use of bespoke equipment and/or materials that are additional to those required for conventional engine operation. Any weight and/or energy penalties incurred in order to achieve contrail suppression require careful scrutiny to determine whether such penalties outweigh the possible contrail reduction benefits on climate impact.

Another method of potentially reducing the negative impact of contrail formation is to route aircraft around/above/below regions of air susceptible to contrail formation and/or persistence. However, in addition to the added complexity for air traffic control and pilots, the re-routing of aircraft away from predetermined flight paths may cause increased fuel burn, not only by increasing duration and distance travelled, but also by causing departure from optimal cruise conditions of the aircraft engines. Such re-routing may also disadvantageously cause disruption to schedules by increasing flight duration. Furthermore, it will be appreciated that in congested airspace, opportunities to avoid regions of contrail formation and/or persistence may be limited.

Conventional propulsion systems for civil aircraft typically comprise one or more turbofan engine placed under the wings of the aircraft. However, some studies have indicated that so-called distributed propulsion, which involves having numerous smaller propulsion units preferentially arranged around an aircraft, may provide some significant benefits in terms of noise reduction and fuel efficiency when compared with current state of the art propulsive arrangements.

The distributed propulsion units are typically electrically driven with the electrical energy being supplied from a power source mounted onto the air frame. The power source may be a battery but this is usually supplemented by an on board generator powered using a reciprocating engine or, more usually, a gas turbine.

It has been recognised that this arrangement has a greater propensity for contrail formation as the exhaust from the reciprocating or gas turbine engine has a relatively high water-vapour partial pressure relative to the temperature of the exhaust i.e. the "contrail factor", which is used herein to refer to the gradient of a line representing the mixing of engine exhaust air with ambient air, when plotted on a chart using water-vapour partial pressure as the y-axis and temperature as the x-axis, is relatively high. A reduction in an engine's contrail factor reduces the range of ambient conditions under which the engine can form a contrail. Alternatively, at a particular ambient condition (characterised by pressure, temperature and humidity), a reduction in contrail factor may allow a transition from formation of a contrail to non-formation of a contrail.

It is therefore an object of the present invention to manage the formation of contrails by aircraft engines in a manner that reduces negative impact on the climate.

BRIEF SUMMARY OF THE INVENTION

According to a first aspect of the invention there is provided a method of operating an aircraft propulsion system having an engine with an engine core, and at least one propulsive fan for generating a mass flow of air, wherein: fuel is combusted in the engine core to generate an exhaust flow containing water produced by combustion of fuel; the propulsive fan is rotated at a velocity that generates a mass flow of air; the method comprising the steps of monitoring conditions indicative of contrail formation and increasing the ratio of the mass flow of air generated by the propulsive fan to the mass flow of water in the exhaust flow.

The water may be in liquid or vapour form.

The propulsive fan may be coaxial with the engine.

The engine may be a gas turbine engine. The engine may be a reciprocating engine.

Upon sensing conditions indicative of contrail formation the ratio of the mass flow of air generated by the propulsive fan to the mass flow of water in the exhaust flow may be increased by reducing the mass flow of water produced in the core.

The ratio may be increased by increasing the mass flow of air generated by the propulsive fan.

The ratio may be increased by increasing the both the mass flow of air generated by the propulsive fan and by reducing the mass flow of water produced in the core.

The propulsive fan may be coaxially located with the engine core, the mass flow of the air generated by the propulsive fan mixing with the engine core exhaust.

The fan may be bounded by a duct, the duct defining an annular nozzle at its downstream end which directs the mass flow of air towards the exhaust.

The duct may have an actuator that can selectively close its forward opening. The actuator may operate a flap or an inflatable bag.

Upon sensing conditions indicative of contrail formation the ratio of the mass flow of air generated by the propulsive fan to the mass flow of water in the exhaust flow may be increased by increasing the rotational velocity of the propulsive fan to increase the mass flow of air generated.

The propulsive fan may be connected to an electrical network which supplies additional drive energy to increase the rotational velocity of the propulsive fan.

There may be one or more further propulsive units which are distributed around the fuselage and/or wings of the aircraft.

Where the mass flow of water produced in the core is reduced by lowering the rate of fuel burn in the engine core this may reduce thrust generated by the engine core, and the reduced thrust may be mitigated by increasing thrust generated by one or more further propulsive units.

The further propulsive units may be electrically driven fans connected to an electrical power supply via an electrical network, wherein upon sensing conditions indicative of contrail formation power, or increased power, is supplied to the further propulsive units from the electrical power supply.

The electrical power supply may be a battery charged by the engine.

According to a second aspect there is provided an aircraft propulsion system comprising: an engine having an engine core within which fuel is combusted to produce an exhaust containing water produced from the combustion of the fuel, at least one propulsive unit for generating a mass flow of air;

one or more sensor arranged to sense a condition indicative of vapour trail formation by the exhaust flow from the engine; and a controller arranged to control the ratio of the mass flow of water in the exhaust to the mass flow of air propulsed by the propulsive unit such that the ratio is reduced upon sensing of said condition by the one or more sensor.

Upon sensing of said condition by the one or more sensor the rotational velocity of one or more of the at least one propulsive unit may be increased.

One of the at least one propulsive units may be coaxial with the engine core.

The coaxial propulsive unit may be a fan located within a duct having an annular flow opening downstream of the fan.

The flow opening may comprise a portion of a bypass duct of the engine.

The flow opening may comprise a variable area fan nozzle.

At least one of the propulsive units may be connected to the engine via an electrical network.

The electrical network may comprise at least one electrical storage unit that can supply electrical energy to the at least one propulsive fan via the electrical network to effect rotation of the propulsive unit.

The aircraft propulsion system may comprise an ambient condition sensor, such as temperature, pressure, light and/or humidity sensor.

The controller may be arranged to suppress contrail formation only when ambient air is supersaturated with respect to ice and/or when ambient light is below a predetermined threshold level.

The aircraft propulsion system may comprise an altitude sensor with a controller arranged to reduce the ratio of the mass flow of water in the exhaust to the mass flow of air propulsed by the propulsive unit only at an altitude above a predetermined threshold and/or within a predetermined altitude range.

The one or more sensor may comprise a receiver for receiving an electromagnetic or acoustic reflection and/or emission from a contrail downstream of the engine.

According to a further aspect there is provided a method of operating a gas turbine having an engine core, the engine core combusting fuel within an air flow passing through the core to generate an exhaust flow containing water produced by combustion of fuel; a flow of air bypassing the engine core and mixing with the exhaust flow containing water; the method comprising the steps of monitoring conditions indicative of contrail formation and increasing the ratio of the mass of the air flow mixing with the exhaust flow to the mass of water in the exhaust flow.

According to a further aspect there is provided a method of controlling the exhaust flow from an engine in an aircraft propulsion system having at least one electrical propulsion unit driven by power supplied from the engine having a core and a bypass, the method comprising the steps of monitoring conditions indicative of contrail formation and increasing a flow through the bypass of the engine and/or reducing a rate of fuel-flow to the core of the engine to reduce or abate a contrail from the engine.

The invention may achieve a contrail suppression effect by selectively altering the total heat input into an exhaust of a power plant of an engine within a distributed propulsion system without increasing the water vapour content by the same amount thereby decreasing the contrail factor of the power plant.

Although the description is mostly directed to aircraft having distributed propulsion units it will be appreciated that aircraft without distributed propulsion may also operate in accordance with some aspects described herein.

Any of the features defined above in relation to one aspect may be applied to another aspect.

BRIEF DESCRIPTION OF THE DRAWINGS

Practicable embodiments of the invention are described in further detail below by way of example only with reference to the accompanying drawings, of which.

DETAILED DESCRIPTION OF THE INVENTION

Figure 1:
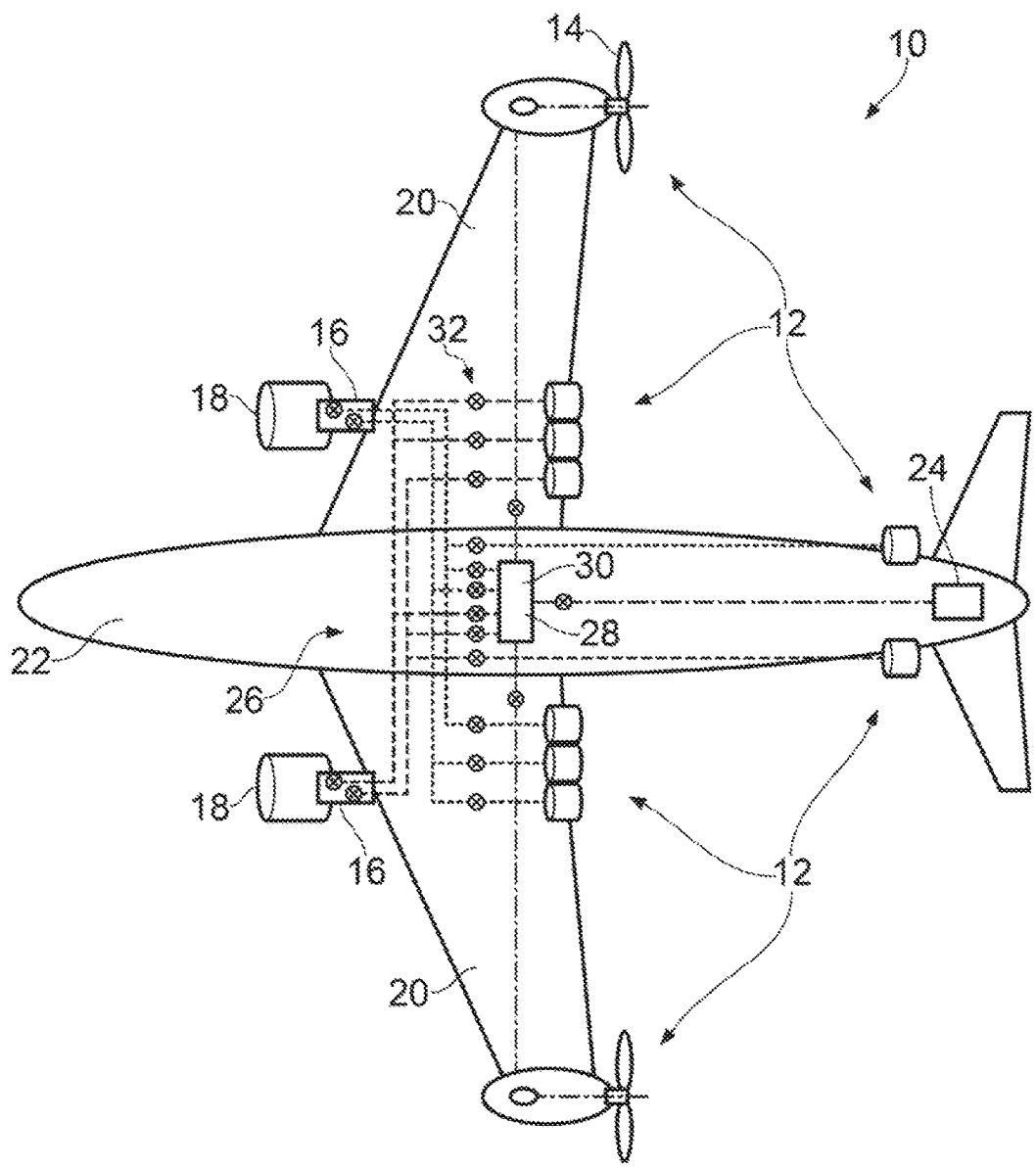
FIG. 1 shows an overview of an aircraft having a distributed propulsion system.

In FIG. 1 there is shown a schematic representation of an aircraft having the electrical propulsive system 10 according to the present invention. Although the rest of the description is mostly directed to aircraft having distributed propulsion units it will be appreciated that aircraft without distributed propulsion may also operate in accordance with some aspects described herein. The electrical propulsive system 10 includes a plurality of electrical propulsive units in the form of fans 12 which are rotatably driven by electrical machines, for example superconducting electrical machines. Each of the fans 12 includes a rotor having fan blades 14 mounted on a rotatable hub and may have a blade pitch adjustment mechanism for synchronously adjusting the pitch of the blades 14 relative to the air flow which passes them in use. Although only the propulsive units on the wings are shown as having blades 14, it will be appreciated that all of the propulsive units 12 include fans and blade arrangements.

The electrical propulsive units 12 are placed in various locations around the fuselage 22 and wings 20 of the aircraft so as to ingest boundary layer air which is energised and exhausted to provide propulsive thrust. Having a plurality of smaller propulsive units 12 rather than two (or more) large gas turbine engines helps reduce drag and allows for a more efficient bypass ratio of the propulsive system 10, thereby increasing efficiency of the aircraft.

In the embodiment shown, there are six electrical propulsive units 12 located towards the trailing edge of the wing and two located towards a rear portion of the fuselage flanks. Two further units are located on the tips of the wings. All of the propulsive units 12 may be of the ducted variety or open rotor propellers as are known in the art.

The electrical machines which drive the propulsive units 12 may be superconducting synchronous machines having superconducting rotors which are permanently magnetised in use. The rotors are driven using stator windings which may or may not be superconducting. Such machines are known in the art. As will be appreciated, the machines may be operated as motors or generators.

The electrical propulsion system 10 also includes a plurality of electrical sources in the form of electrical generators 16 in the form of synchronous machines, which are driven by power plants, such as the shown two main gas turbine engines 18 located underneath the wings 20. The gas turbine engines 18 operate in a conventional manner but are configured for operation as part of a distributed propulsion system 10 and as such may have a reduced bypass ratio so as to reduce aero-dynamic drag, or the bypass duct is removed completely to further reduce the aero-dynamic drag.

The electrical generators 16 and the electrical machines of the propulsive units 12 are electrically connected via cables in the form of a bus system 26 and as such collectively form an electrical network. As will be appreciated, the electrical network may also include ancillary equipment in the form of isolators and fault current limiters which are generally indicated by reference numeral 32. The electrical generators 16, bus system 26 and fault current limiters within the network may or may not be superconducting.

The propulsive system 10 includes a control system which has at least one controller 28 which is configured, at least in part, to monitor and determine the required thrust for each propulsive unit and regulate the pitch of the fan blades to control the amount of propulsive force produced and to optimise the aerodynamic efficiency of the fan blades over a wide range of combinations of aircraft forward speed and fan rotational velocity.

In the embodiment shown an auxiliary power unit 24 is provided at the rear of the fuselage that is arranged to provide electrical power to the aircraft when the main electrical generation system is inoperable, for example, prior to the engines 18 being started. The auxiliary power unit may be replaced or supplemented by an electrical storage device e.g. one or more battery units.

The separation of the power plant from the propulsive units means that the engine 18 is susceptible to contrail formation in a much wider range of atmospheric conditions since the exhaust contains all the water vapour released from combustion but does not contain all the heat energy that would be present in a turbofan exhaust since, in a distributed propulsion arrangement, some or all of the fan work is exhausted elsewhere.

Figure 2:
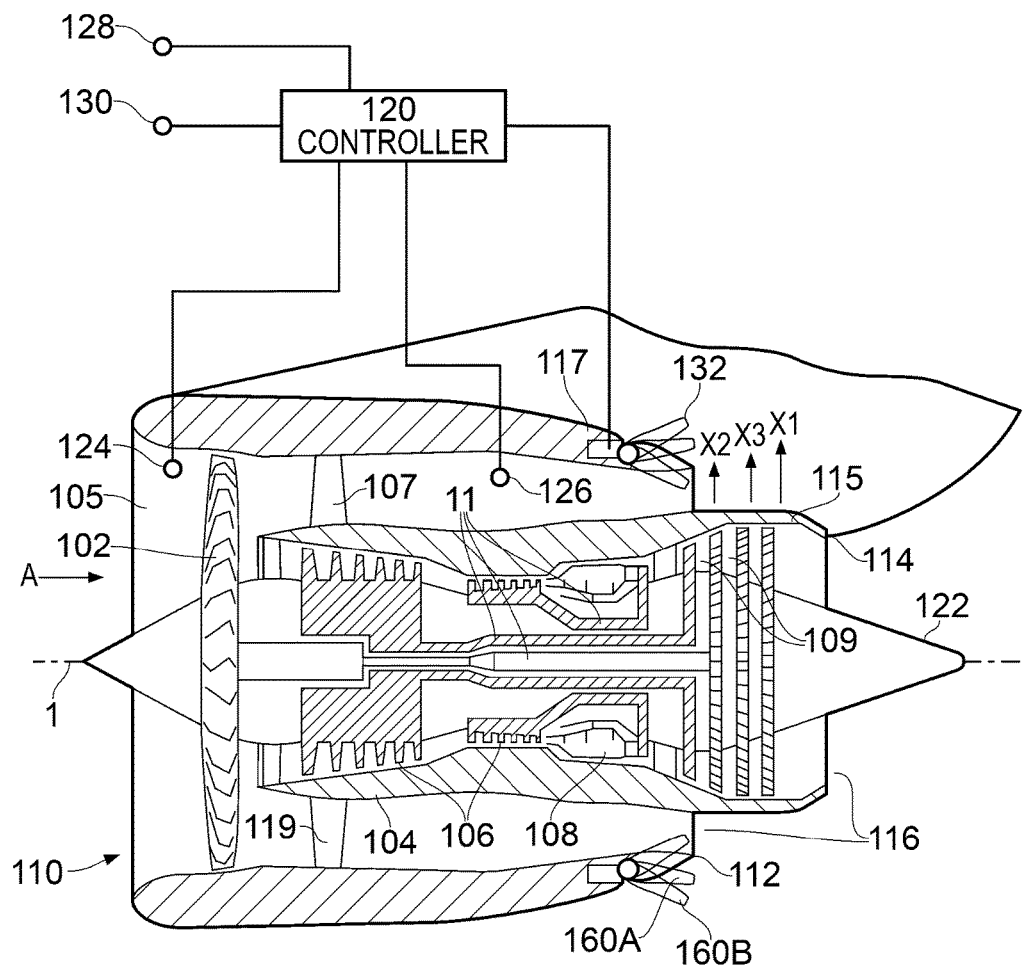
FIG. 2 shows a longitudinal section through an aircraft engine.

FIG. 2 depicts a simple schematic of an arrangement of a power plant 110, 18 for an aircraft. The power plant has a core engine that drives an electrical generator and a ducted bypass past the core, the core exhaust and the bypass exhaust mixing either in a combined duct or shortly downstream of the end of one of more of the core or bypass duct. The core engine may be a reciprocating engine, or a gas turbine. For the rest of this application the embodiments will be described with respect of a gas turbine core engine.

A gas turbine core engine comprises in axial flow series a series of compressors 106, a combustor 108 and a series of turbines 109. There is a general direction of airflow through the turbofan gas turbine engine in operation and the terms upstream and downstream are used with reference to this general flow direction.

The flow through the core engine flows through the compressors where it is compressed and passed into the combustor 108 where it is mixed with fuel and the fuel is burnt in the air in the combustor. The combustion of the fuel in the compressed air in the combustor 108 produces hot gases including water vapour, which exit the combustor and flow downstream through and drive the turbines. The turbines drive the compressors and an electrical generator via shafts which drivingly connect the turbines with the compressors and the electrical generator.

The exhaust gases leaving the turbines flow through the exhaust nozzle assembly to provide some propulsive thrust. At, or just after the exhaust nozzle, air passing through the bypass 107 is mixed with the core exhaust.

The air that passes through the bypass duct has, at the exit of the duct, a higher temperature than the ambient air. The combined mixed exhaust flow has a significantly lower contrail factor than the core engine exhaust flow alone. By increasing the amount of heat input to the flow of air through the bypass duct relative to the amount of water input or formed in the core the contrail factor can be further reduced.

Figure 3:
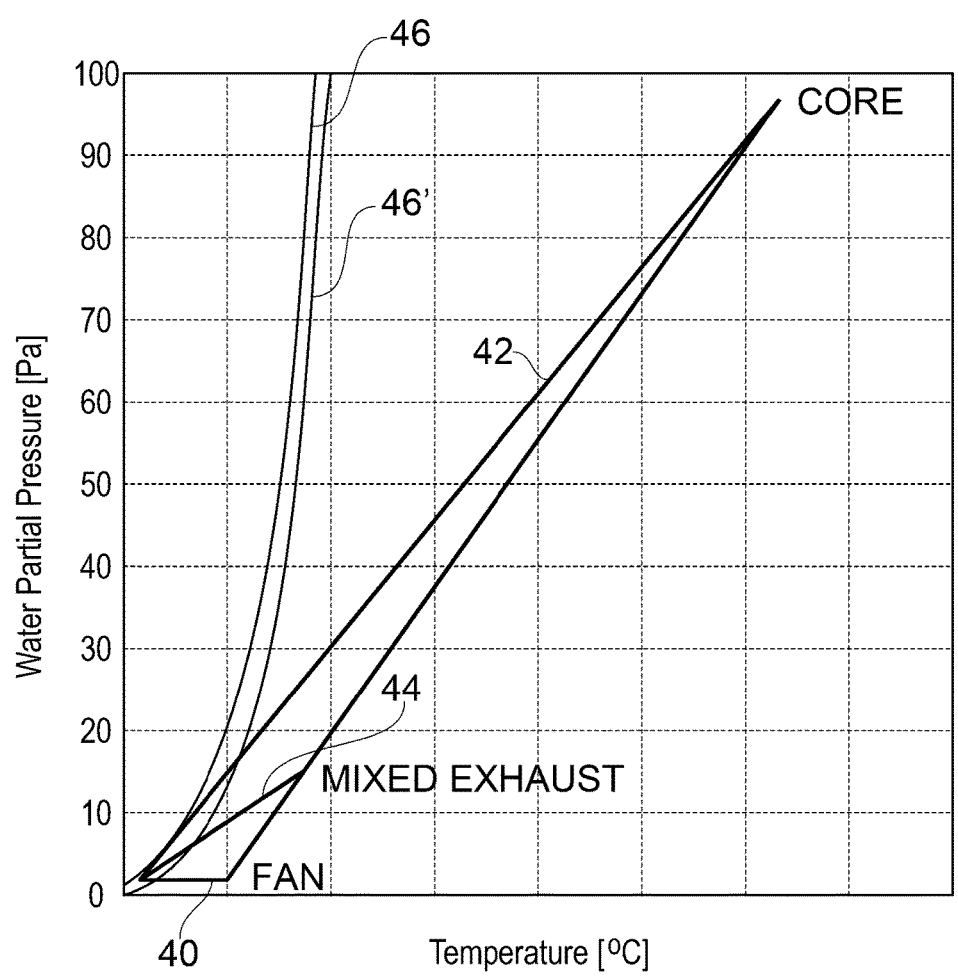
FIG. 3 is a graph depicting contrail factors for different operational regimes of the engine of FIG. 2.

FIG. 3 is an exemplary graph showing the mixing line of a fan exhaust 40, a core exhaust 42 and an exhaust comprising the combination of the core exhaust and the fan exhaust 44. Each of the mixing lines 40, 42, 44 is characterised by a gradient, sometimes known as the "contrail factor", which is the ratio between the added water vapour to added heat in the exhaust relative to ambient conditions. Each mixing line shows the evolution of temperature and water vapour partial pressure from exhaust conditions to ambient conditions. Also shown is the water saturation curves 46, 46' of air at given temperatures. If any part of a mixing line lies on or to the left of a water saturation curve there is a likelihood that contrails will form or may form. If a mixing line lies entirely to the right of the water saturation curve there is no chance, or minimal chance, that contrails will form.

Turning first to the core exhaust the gradient of the line 42 is relatively steep i.e. although the exhaust is hot there is also a large amount of water vapour within the exhaust. Within some regions of operation at least part of the line 42 lies to the left of the water saturation curve indicating that there is a risk of contrail formation.

The contrail factor of the fan (being the gradient of the line 40), by contrast, is close to zero. Although the fan inputs work into the flow this is achieved without any water being supplied into the flow. At no point does the line pass to the left of the water saturation curve so there is no, or minimal risk of contrail formation.

The contrail factor, and hence the gradient of the mixing line 44, of the mixed exhaust is less than the contrail factor, and hence the gradient of the mixing line 42, of the core exhaust but greater than the contrail factor, and hence the gradient of the mixing line 40, of the fan exhaust. It will be appreciated that by increasing the temperature of the fan flow, or increasing the amount of thrust produced by the fan relative to the thrust produced by the core and, assuming that the amount of water within the mixed exhaust stays the same, or decreases, the contrail factor can be further reduced to the point at which the risk of contrail formation is negated for all but extreme situations. A decrease in the rate of water vapour emission can be achieved by reducing the rate of fuel-flow to the combustor 108.

As mentioned earlier, in a distributed propulsion architecture the coaxial fan may not be needed to provide propulsive thrust as this is achieved by the distributed fans. Accordingly, it may be desirable to selectively open and close the bypass in accordance with the need for operation of the coaxial fan.

Figure 4:
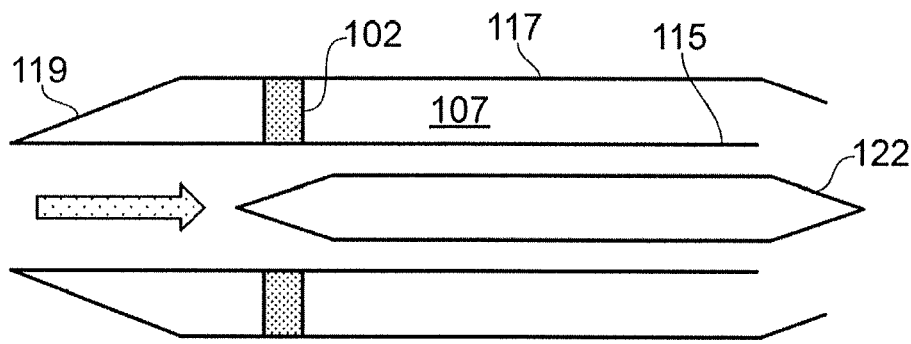
FIGS. 4a and 4b are simplified images of a gas turbine having a bypass with a modulating inlet.
Figure 4:
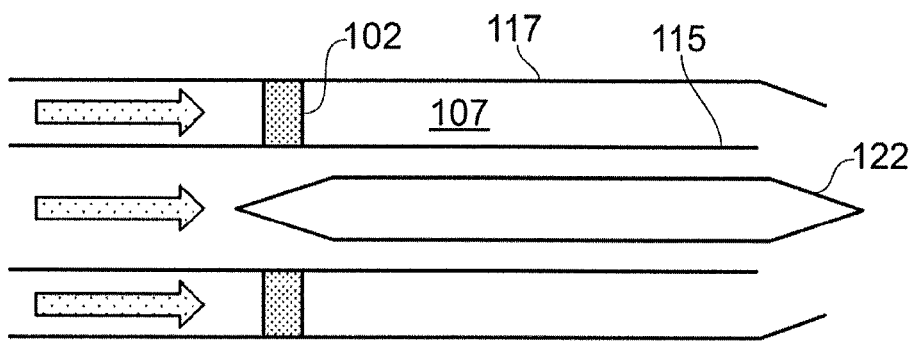

At times when contrail suppression, or fan operation, is not required the airflow through the bypass may be reduced, or optionally closed off, in order to reduce drag as far as possible. FIG. 4 depicts a simplified image of a possible arrangement with FIG. 4a depicting an operational state in which the bypass is closed and FIG. 4b depicting an operational state in which the bypass is open.

The bypass closure 119 may be one or more flaps that may be moved between a position in which the bypass is closed (FIG. 4a) or substantially closed and a position in which the bypass is open (FIG. 4b). In the position in which the bypass is closed the flap preferably directs the air radially outwardly and around the engine nacelle 117 by presenting a sloped surface to the air flow. In an alternative arrangement the flap provides a bluff surface but this will have a detrimental impact on the drag of the engine.

The flap may be hinged at a forward edge in which it lies flush against the radially inner wall 115 of the bypass when the duct is open. The flap may be hinged at a rearward edge in which the flap rotates outwardly to form an extension of the nacelle or radially outer wall 117 of the bypass duct when the duct is open.

Alternatively, the bypass may be closed by an alternative mechanism e.g. an inflatable bag that may lie against a surface of the bypass duct in an uninflated state when the bypass duct is required to be open and across the bypass in an inflated state when the duct is required to be closed. The bag may be shaped such that in an inflated configuration it presents a slope to the air flow that directs air radially outwardly and around the engine.

In one embodiment shown in FIG. 2 the exhaust nozzle assembly 116 comprises two concentric exhaust nozzles, a radially outer bypass, or fan, exhaust nozzle 112 and a radially inner core exhaust nozzle 114. The core exhaust nozzle 114 is defined at its radially outer extent by a generally frusto-conical core nozzle wall 115 and at its radially inner extent by a frusto-conical engine plug structure 122. The bypass, or fan, exhaust nozzle 112 is defined at its radially outer extent by a nacelle, or fan casing, 117 and at its radially inner extent by the core nozzle wall 115.

The bypass, or fan 102, exhaust nozzle 112 is a variable area fan exhaust nozzle. The bypass duct 107 is also defined at its radially outer extent by the nacelle, or casing, 117, which is generally annular and arranged coaxial with the engine axis 1. Thus the nacelle, or fan casing, 117 defines a flow passage through the turbofan gas turbine engine 110. The bypass, or fan, variable area exhaust nozzle 112 is arranged at the downstream end of the nacelle 117.

A controller 120 is arranged to control an actuator 132 to vary the cross-sectional area of the variable area fan exhaust nozzle 112 according to sensor signals. The nozzle may adopt different positions 160A, 160B as required.

Although in the above-described example, the actuator 132 has discrete positions of actuation, it will be appreciated that any flow opening which is actuable according to the invention will typically be variably actuable over the available range of actuation so as to adopt any suitable condition within that range according to the sensed operating/ambient conditions. Accordingly the actuator or flow opening may be range-taking. In one example a plurality of predetermined actuator positions and/or flow opening areas may be defined such that the controller selects one of the predetermined options in use, for example the predetermined option which is closest to an optimal position determined by the controller.

In an alternative embodiment a fan may be associated with the bypass duct which may be operable or operated at a different rotational velocity at times where the contrail suppression is deemed necessary and desirable.

The rotational velocity of the fan may be controlled to change either or both of the heat input into the flow of air through the bypass duct or the volume of air passing through the bypass. The change in rotational velocity may feature in combination with other features such as a variable pitch rotor, variable area nozzle and/or a variable outlet guide vanes 119 to help accommodate a wide range of fan pressure ratios and aircraft forward speed.

The rotational velocity of the fan may be used to capture energy during decent, acting as a turbine. It may also be used as a thrust augmenter during, for example, take off, climb, top of climb, step-climb, amongst others so as to enable the area, and hence drag, of the other propulsive fans to be reduced slightly.

The fan may be driven electrically, mechanically or as a hybrid where the fan is driven mechanically with a supplemental electrical drive, or electrically with a supplemental mechanical drive. A mechanical drive with a supplemental electrical drive may be used where the fan is used for general propulsive purposes as well as for contrail suppression.

When the engine is operating in a mode that suppresses contrails the bypass air flow may be increased by increasing the fan rotational speed with a possible change in fan blade pitch and/or a possible change in fan OGV pitch and/or a change in nozzle area.

In an arrangement which supplements a mechanically driven fan, or where the fan is purely electrically driven, the core fuel flow, core mass flow, and hence the water-vapour emissions in the core, can be decreased and an electrical drive to the fan used to supplement the reduced mechanical drive.

As there is a reduction in core mass-flow and water input into the core mass-flow there is an improved contrail factor even if the electrical drive is used to input enough power to the fan to maintain the desired operating thrust. By increasing the electrical drive for the fan to push even more air through the bypass duct than required for the operating propulsion the dilution effect can be enhanced and hence the contrail factor can be further reduced. The thrust produced by the other propulsive fans may be adjusted by the system controller 28 to maintain the commanded or desired total thrust required by the aircraft.

Figure 5:
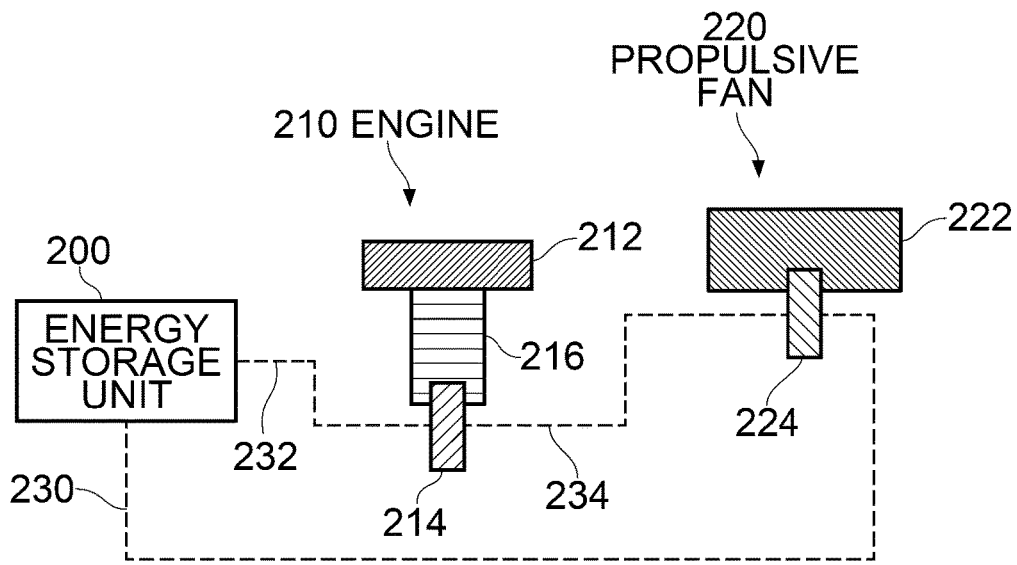
FIG. 5 depicts components of a distributed propulsion system.

FIG. 5 depicts a simplified image of the propulsion system that has an energy storage unit 200 which may be a battery or other form of energy storage if deemed suitable such as, for example, flywheel, capacitor-array, compressed air, liquid air. An engine 210 comprises a coaxial fan 212, an engine core 216 and a motor/generator 214 configured to drive or be driven by the fan 212 and/or the engine core 216. The motor/generator 214 is drivingly connected to the fan and/or engine core via one or more shafts, one or more of which may pass through a gearbox to change the rotational ratio of the fan relative to the motor/generator.

The engine core drives the fan and/or motor/generator and whilst this is described in the specification as being a gas turbine for some circumstances an internal combustion, or reciprocating, engine may be used.

A remote propulsive fan 220 comprising a fan 222 and a motor/generator 224 that is either integral with or drivingly connected via e.g. a shaft to the fan and configured to drive or be driven by the fan according to a prevailing mode of operation. In practice there is more than one remote propulsive fan. In some embodiments there could be many small remote propulsive fans (each with its own motor/generator) configured to ingest and re-energise the boundary layer air flowing over or under the aircraft's wings or other surfaces such as the fuselage.

A first electrical cable 230 is configured to transport electrical energy (in either direction, according to the prevailing mode of operation) between the energy storage unit 200 and the motor/generator 224.

A second electrical cable 232 is configured to transport electrical energy (in either direction, according the prevailing mode of operation) between the motor/generator 214 and the energy storage unit 200.

A third electrical cable 234 is configured to transport electrical energy between the motor/generator 214 and the motor/generator 224. The direction of energy flow would, in all envisaged modes of operation, be from 214 to 224. However flow in the opposite direction should not be ruled out.

There would also be a control and decision/making unit (not shown) which would be in signal communication with the energy storage unit 200, the engine core 216, the motor/generator 214 and the motor/generator 224. The control and decision making unit could be an integral part of, or a module within, the engine-control-unit (ECU) of the engine 210, or it may be a separate physical entity in signal communication with the ECU. The control and decision making unit may also be in signal communication with the co-located fan 212, and the fan 222, for the purposes of instructing changes to their respective blade pitches. Furthermore, the control-and-decision-making unit would also need to be in signal communication with any variable-area nozzles which may be present, in order to determine and instruct changes thereto.

FIGS. 6 to 12 indicate operational practices of the engines in different flight regimes. In FIGS. 6 to 12, the presence of an "X" within the engine 210 indicates that the engine is running and generating thrust (via its co-located fan 212) and/or electrical power (via its motor/generator 214). The absence of an "X" means that the engine is switched off completely or is at a very low power setting, for example an "idle" setting.

Figure 6:
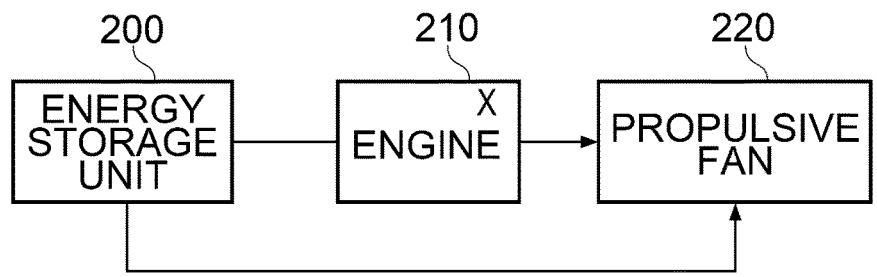
FIGS. 6 to 12 depict representations of the operating mechanisms for a number of different flight regimes.

In FIG. 6, representative of take-off and climb (including in particular step-climb and top-of-climb as well as the climb away from a departure airport), the engine 210 is running (as denoted by the X) and powering its own coaxial fan 212 as well as driving the motor/generator 214, which is providing electrical energy to the remote propulsive fan 220. The energy storage unit also provides supplementary power to the remote propulsive fan 220. Since top-of-climb is often the flight condition which determines the size of the engine, the fact that in this invention the engine output is supplemented in this flight condition by energy from the energy storage unit means that the engine 210 (and particularly the engine core 216) can be smaller (or fewer in number), leading advantageously to reduced drag.

Figure 7:
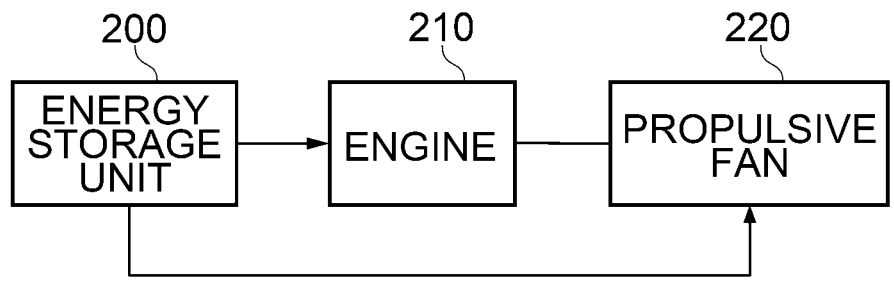

In FIG. 7, representative of the cruise phase of a short flight which can be achieved entirely using stored electrical energy, the engine core 216 of the engine 210 is not used, and the energy storage unit 200 provides energy to drive the remote propulsive fan 220 and a co-located fan 212 within the engine 210. It will be appreciated that such electric-only operation need not be limited to the cruise phase of flight, and that electric-only operation in other phases of flight could be contemplated, subject to the capacity and discharge-rate capability of the energy storage unit 200.

Figure 8:
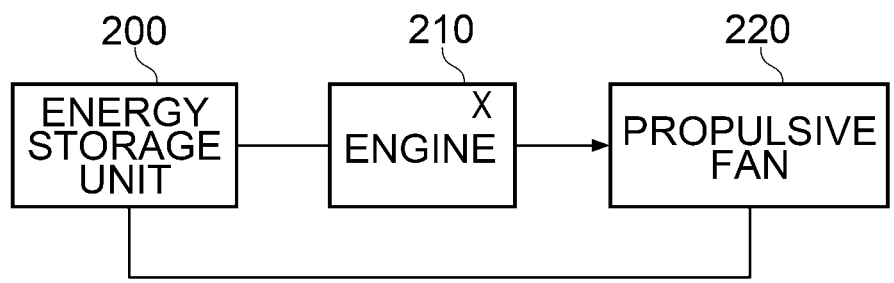

FIG. 8 shows a mode of operation corresponding to the cruise phase of a longer-range flight which cannot be achieved purely on stored electrical energy alone. In this mode of operation, the engine 210 is causing the motor/generator 214 to generate electrical energy which is supplied to the motor/generator 224 of the remote propulsive fan 220. Optionally, the engine 210 is also driving its own co-located fan 212. Alternatively, the airflow to the co-located fan 212 could be closed off (as shown in FIG. 4) to minimise drag.

Figure 9:
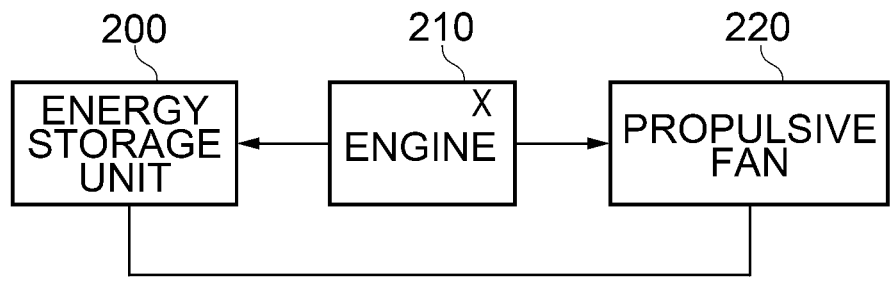

FIG. 9 is similar to FIG. 8, with the addition that in this mode of operation the energy storage unit is also receiving electrical energy from the motor/generator 214 of the engine 210, and is thus being charged. The engine throttle is set at a suitable level to meet the aircraft's thrust requirement as well as providing charge to the energy storage unit 200.

Figure 10:
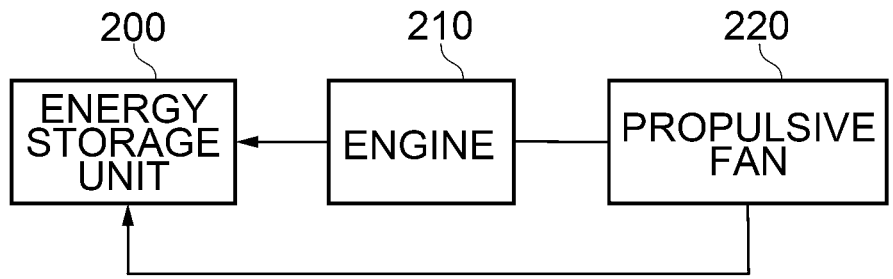

In FIG. 10, representative of the descent phase of flight, the engine 210 is in its unlit or idle state. The fan 222 of the propulsive fan 220 is being driven ("wind-milling") by air-flow resulting from the forward motion of the aircraft, and as a result is causing the motor/generator 224 to generate electrical energy which is used to charge the energy storage unit 200. Optionally the co-located fan 212 of the engine 210 is also being used in a "wind-milling" capacity to further charge the energy storage unit 200 with electrical energy generated by the motor/generator 214. Alternatively the airflow to the co-located fan 212 could be closed off (as shown in FIG. 4) to reduce drag.

Figure 11:
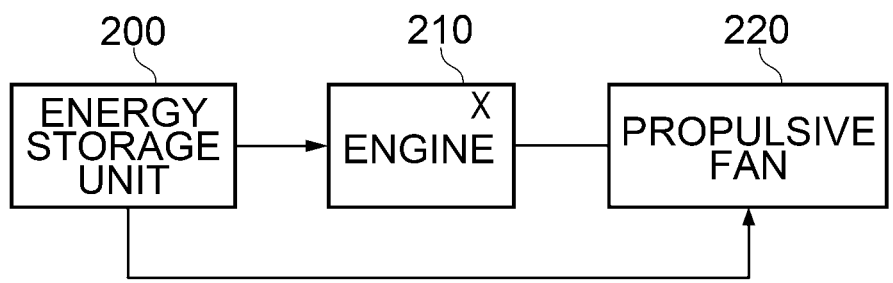

In FIG. 11, the propulsion system is operating in a contrail-suppression mode. This mode is selected when a) contrail formation is observed and/or predicted according to observed ambient conditions and the engine's operating condition prior to selection of this mode, and optionally b) ambient conditions are conducive to contrail persistence. c) Further criteria could be employed in deciding whether or not to suppress the formation of a contrail.

Figure 12:
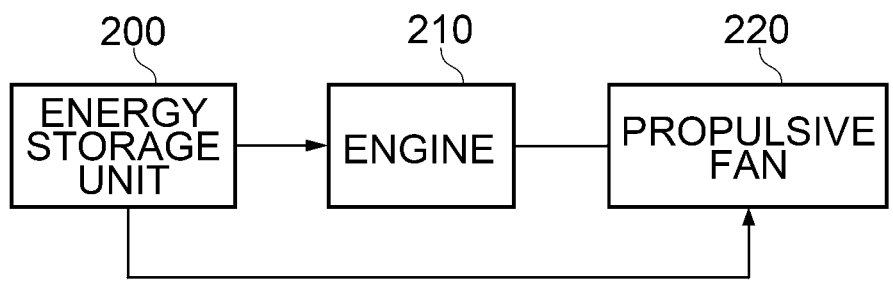

FIG. 12 shows a special case of FIG. 11 in which the fuel-flow rate to the engine core 216 is reduced down to zero (or very close to zero corresponding to an idle setting) for the purposes of contrail suppression. In this mode of operation, the aircraft is flying exclusively on stored electrical energy drawn from the energy storage unit 200, for the duration of the contrail suppression requirement. As a result the diagram resembles that for all-electric operation (FIG. 7). This mode is selected if a more modest reduction in engine fuel flow rate is insufficient to suppress contrail formation, or if electric-only cruise is deemed advantageous for other (i.e. non-contrail-related) reasons.

Returning to FIG. 2, the turbofan gas turbine engine 110 has a plurality of engine operation sensors shown schematically at 124 and 126. The sensor examples 124 and 126 may be arranged to measure pressure at the intake 105 (i.e. upstream of the fan 102) and also the total pressure in the bypass duct 107, thereby allowing determination of the power produced by the engine 110. However this provides just one example of an engine operation sensor arrangement and there are many additional or alternative engine sensor arrangements that may be used in conjunction with the invention as will be described below.

A controller 120 is also arranged to receive signals of sensed parameters from externally of the engine 110, such as from one or more ambient condition sensor 128 and/or a contrail detection sensor 130. The ambient sensor 128 comprises a plurality of sensors for measuring altitude (e.g. ambient pressure), temperature and/or humidity. The contrail detection sensor in this example comprises an optical depth sensor having a field of view downstream of the engine exhaust (i.e. to detect formation of contrails aft of the engine). Alternative contrail detection sensors could be used, such as an acoustic transmitter/receiver. Any of the external sensors 128, 130 may be mounted on the aircraft body or wing.

The controller 120 is arranged to receive signals of sensed parameters in use from the engine operation and other sensors. The sensors 124-130 supply signals/measurements to the controller 120 via connecting leads or else a local wireless network.

The controller 120 is typically a general engine controller, i.e. arranged to control numerous aspects of engine operation in addition to the contrail mitigation system described herein. Accordingly it will be appreciated that such a controller will typically receive inputs from a significant number of other sensors. However one or more bespoke control algorithm (e.g. one or more module of code) will control operation of the controller as a contrail mitigation controller in accordance with the invention. Such functionality dictates which engine operation variables are available for control in accordance with the contrail mitigation strategy. The controller will also determine what scope of control is available for the purpose of contrail mitigation based upon other engine operation requirements such as engine-throttle-setting and/or thrust-requirement setting that must be prioritized above contrail mitigation needs.

Ambient condition sensors 128 are as described above and are arranged to output real-time or near-real-time information concerning the ambient pressure, ambient temperature and ambient humidity of air through which the aircraft is flying. In another example, one or more of those sensors 128 may optionally be replaced and/or supplemented by a database of forecast data (e.g. obtained prior to the flight and/or updated periodically during the flight via radio-link or similar) which details the ambient condition(s) that the flight will encounter along its proposed flight routing and altitude profile, taking account of the expected time at which each point of the proposed route will be passed.

A deployment policy or contrail suppression policy may be employed. The policy allows prioritisation of the control system to achieve greatest beneficial climate impact. That is to say the policy determines how best the invention should be employed to ensure that any increased fuel burn due to reduction of overall propulsion system efficiency is outweighed by the beneficial impact of contrail suppression/mitigation. The policy can be implemented by one or more routine or calculation to assess whether or not to attempt contrail suppression according to either or both of:

An assessment of the likely climate warming impact of the contrail if it is allowed to form An assessment of any cost penalty associated with allowing the contrail to form The assessment of climate warming impact would primarily take into account one or more of the following factors:

Will the contrail persist?

Over the contrail's lifetime/persistence, what is the balance between day-time and night-time?

What is the temperature of the ambient air in which the contrail will reside?

Using answers to the above three questions, a decision on whether or not to deploy the invention in an effort to suppress the contrail's formation can be taken. Based on the above, there are a number of options for a deployment-policy, which can be used in isolation or combination to inform a contrail suppression decision:

a) Estimate a climate warming impact of the contrail if allowed to form, and apply a threshold below which contrail-suppression will not be attempted b) As a) but assessing the reduction in climate warming impact that can be achieved by this invention per extra unit mass/weight/volume of fuel burned.

c) As b) but assessing the contrail-related benefit due to the reduction in warming impact against a corresponding threshold/margin, which could be tailored according to the aircraft operator's view d) Alternatively, employ one or more pre-determined deployment rule based on a contrail characteristic or ambient condition, e.g. to act against persistent night-time contrails only.

In the distributed propulsion architecture once a contrail mitigation operation is identified the engine throttle is reduced (thus reducing the mass flow rate of water ejected from the exhaust of the engine core 216. The speed of the co-located fan is increased (if necessary) by supplementary electrical drive from the motor/generator 214, powered by stored electrical energy from the energy storage unit 200, the area of the exhaust nozzle is adjusted or further heat is input into the exhaust flow without adding additional water. This has the advantage of "diluting" the water-vapour-rich exhaust of the engine core 216 with ambient air of much lower humidity. The mixing of the exhaust of the engine core 216 with the exhaust of the co-located fan 212 creates a combined exhaust flow within which the peak humidity reached during mixing with ambient air is lower than would be the case if the exhaust of the engine core 216 were to mix directly with ambient air. The reduction in engine fuel-flow rate, and the optional increase in the mass flow rate of ambient air through the co-located fan 212, increases the dominance of the exhaust of the co-located fan 212 within the mixed exhaust, thus reducing the peak humidity reached during mixing with ambient air and hence suppressing the formation of a contrail.

The balance—between a) engine core fuel-flow-rate reduction and b) co-located fan speed increase—provides a range of possible combinations which could achieve contrail suppression. The combination corresponding to minimum efficiency-loss would likely be the combination of choice The remote propulsive fan 220 is provided with supplementary electrical energy drawn from the energy storage unit 200, and its speed is adjusted such that the aircraft's overall propulsive needs are met. In other words the thrust provided by the remote propulsive fan is adjusted to compensate for whatever changes in thrust arise from the contrail-suppression adjustment made to the engine 210.

In a decision-making process for determining whether control steps are required to mitigate against contrail formation the control system operates a primary loop to check whether the operating conditions (i.e. the ambient conditions and/or engine operation parameters) have changed materially since a previous iteration. The operating conditions could comprise any, or any combination of, ambient temperature, ambient pressure, ambient humidity, altitude, and/or engine throttle setting or engine operating point. Any material change may comprise change of any one or more parameter to an extent that will materially alter a contrail characteristic (or persistence, or occurrence of contrails). This primary loop can be iterated without changing existing settings until a relevant change to operating conditions is determined. Current operating conditions could be stored at each iteration such that the next iteration can compare current operating conditions against one or more recorded set of previous operating conditions. Alternatively, current operating conditions are stored during the first iteration of the primary loop and thereafter only when a material change to the operating conditions is detected relative to the previously stored value. In any example, a log of previous operating conditions is maintained to allow comparison with current or most recently sensed conditions.

The controller then determines, e.g. according to a current usage/deployment policy, whether it is deemed appropriate to use a method for mitigating contrail suppression under the current operating conditions. For instance, it may or may not be considered appropriate to only use this invention when contrails persist, e.g. if ambient relative humidity over ice is 100% or greater. Additionally or alternatively, it may be deemed inappropriate to use the invention if engine operating conditions or external requirements prioritise thrust or another engine parameter to the extent that there is no available scope to apply contrail suppression. Additionally or alternatively, the decision to use or not to use this invention to modify contrail properties may be informed by other factors such as the ambient temperature and/or the strength of incoming sunlight incident upon the formed contrail. For example, it may be deemed appropriate to attempt to suppress the formation only of contrails which are both persistent and existing primarily during the night-time. Such additional decision criteria would avoid the need to suppress contrails that do not bear a significant climate-warming impact. Accordingly it is possible in any example of the invention that an ambient condition sensor could comprise a light sensor.

An assessment of whether or not a particular contrail characteristic that would warrant mitigation steps is undertaken by checking whether one or more ambient sensor reading and/or engine operation parameter achieve a threshold level. In one example, a vapour trail detection sensor 130 may be used to trigger contrail mitigation action and/or to verify a determination of the presence or absence of a contrail.

If there has been no material change in the operating conditions, or a material change in the operating conditions is detected but any of the other conditions described above are not satisfied, then no change to the current contrail suppression control settings are made.

In various examples of the present invention, it is considered pertinent to disable the contrail suppression system during one or more flight phase, such as during take-off, climb and/or approach, where emergency situations may demand that more thrust is commanded quickly, whilst still maintaining engine operation within acceptable TGT and shaft speed limits.

The present invention may focus particularly on the avoidance of contrail formation in regions of ice-supersaturated (ISS) air. However, on average, aircraft spend only a small proportion of their flight-time in ISS air, and so the proportion of the flight during which a contrail suppression mechanism needs to be active in order to mitigate against a majority of the negative climate impact of contrail formation is relatively small. Thus, instead of attempting to suppress all contrails to some level, the invention focuses on the careful identification of specific periods only in which a reduction in engine efficiency to suppress contrail formation can bring about a net positive climate impact beyond what would be achieved using conventional engine control.

Averaged across aviation as a whole, it has been found that aircraft spend (very approximately) in the region of 15% of flight time in ice-supersaturated (ISS) air.

This, when viewed in conjunction with the dominance of persistent contrails in the overall climate impact of AIC, means that there is therefore an opportunity to exert a significant influence over contrail-related warming through interventions carried out over a relatively small proportion of aircraft flight time.

Whilst the embodiment described above refers primarily to an arrangement in which an engine comprising a core and optionally a fan forms part of a distributed propulsion system comprising remote propulsive fans, it will be appreciated that the contrail-suppression method comprising a reduction in the core fuel-flow rate of an engine in conjunction with electrical-supplementation of the power supplied to the fan of the same engine could also be applied to a gas turbine, including a high-bypass-ratio gas turbine, irrespective of the existence of remote propulsive fans.

It will also be appreciated that a related approach to contrail suppression, effective particularly at low throttle conditions or idle conditions such as during descent or during loitering, involves a temporary reduction in electrical power offtake from the engine, meeting some or all of the aircraft's electrical power requirements (such as avionics, aileron and elevator control, air-conditioning etc.) from stored energy rather than from the engine power offtake. This is because the engine power offtake slightly reduces the exhaust temperature, but without altering the water vapour emission rate. A reduction in power offtake from the engine thus reduces the engine's contrail factor, in other words the gradient of the mixing line, and hence reduces susceptibility to contrail formation. The materiality of this effect is greater when the magnitude of the power offtake is a significant fraction of the rate of fuel-energy released during combustion, in other words at low throttle settings.

Optionally, mixing between the core exhaust and the bypass exhaust of the engine could be enhanced by a lobed mixer, which might have the additional benefit of slightly increasing propulsive efficiency.

The invention claimed is:

1. A method of operating an aircraft propulsion system having an engine with an engine core, and at least one propulsive fan, the engine core being configured to combust a quantity of fuel to generate an exhaust flow containing water, the water being a product of combustion of the fuel, the at least one propulsive fan being configured to rotate at a velocity that generates a mass flow of air, the at least one propulsive fan being coaxially located with the engine core, and the mass flow of air generated by the at least one propulsive fan mixing with the exhaust flow, the method comprising:
  monitoring for an occurrence of conditions indicative of contrail formation, the conditions indicative of contrail formation including conditions indicating that contrail formation is happening and ambient conditions predictive of contrail formation; and
  increasing a ratio of the mass flow of air generated by the at least one propulsive fan to a mass of water in the exhaust flow when the conditions occur,
  wherein the at least one propulsive fan is bounded by a duct, the duct defining an annular nozzle at a downstream end of the duct, and the annular nozzle directs the mass flow of air to bypass the engine core and flow towards the exhaust flow.

2. The method according to claim 1, wherein the ratio is increased by reducing the mass of water produced in the engine core.

3. The method according to claim 1, wherein the ratio is increased by increasing the mass flow of air generated by the at least one propulsive fan.

4. The method according to claim 1, wherein the ratio is increased by increasing the velocity at which the at least one propulsive fan is rotated to increase the mass flow of air generated by the at least one propulsive fan.

5. The method according to claim 4, wherein the at least one propulsive fan is connected to an electrical network which supplies additional drive energy to increase the velocity at which the at least one propulsive fan is rotated.

6. The method according to claim 2, wherein the mass of water in the exhaust flow is reduced by lowering the quantity of fuel combusted in the engine core, wherein lowering the quantity of fuel combusted reduces thrust generated by the engine core, and the reduced thrust is mitigated by increasing thrust generated by one or more further propulsive fans.

7. The method according to claim 6, wherein the one or more further propulsive fans are one or more electrically driven fans connected to an electrical power supply via an electrical network, wherein, when the conditions occur, power, or increased power, is supplied to the one or more further propulsive fans from the electrical power supply.

8. The method according to claim 7, wherein the electrical power supply is a battery charged by the engine.

9. An aircraft propulsion system comprising:
  an engine having an engine core configured to combust a quantity of fuel to produce an exhaust flow containing water, the water being a product of combustion of the fuel;
  at least one propulsive fan configured to generate a mass flow of air when rotating, the at least one propulsive fan being coaxially located with the engine core, and the mass flow of the air generated by the at least one propulsive fan mixing with the exhaust flow;
  one or more sensors configured to detect an occurrence of conditions indicative of contrail formation by the exhaust flow from the engine, the conditions indicative of contrail formation including conditions indicating that contrail formation is happening and ambient conditions predictive of contrail formation; and
  a controller in communication with the one or more sensors and configured to:
    receive a respective signal from each of the one or more sensors;
    monitor the respective signal from each of the one or more sensors to determine whether the occurrence of conditions indicative of contrail formation has been detected; and
    increase a ratio of the mass flow of air generated by the at least one propulsive fan to a mass of water in the exhaust flow when the occurrence of the conditions has been detected,
    wherein the at least one propulsive fan is located within a duct having an annular flow opening downstream of the duct, and
    the flow opening comprises a portion of a bypass duct of the engine to allow the mass flow of air to bypass the engine core and flow towards the exhaust flow.

10. The aircraft propulsion system according to claim 9, wherein the controller is further configured to increase the velocity of the at least one propulsive fan when the occurrence of the conditions has been detected.

11. The aircraft propulsion system according to claim 9, wherein the at least one propulsive fan is connected to the engine via an electrical network.

12. The aircraft propulsion system according to claim 11, wherein the electrical network comprises at least one electrical storage unit that can supply electrical energy to the at least one propulsive fan via the electrical network to effect rotation of the at least one propulsive fan.

13. The aircraft propulsion system according to claim 9, wherein the controller is configured to increase the ratio only when the one or more sensors detect that ambient air is supersaturated with respect to ice and/or when the one or more sensors detect that ambient light is below a predetermined threshold level.

14. The aircraft propulsion system according to claim 9, wherein the one or more sensors comprises an altitude sensor, wherein the controller is configured to increase the ratio only when the altitude sensor detects an altitude above a predetermined threshold and/or within a predetermined altitude range.

15. The aircraft propulsion system according to claim 9, wherein the one or more sensors comprises a receiver for detecting an electromagnetic or acoustic reflection and/or emission from a contrail downstream of the engine.

16. The method according to claim 1, wherein the duct includes a bypass closure, and wherein increasing the ratio is performed by adjusting a degree of opening of the bypass closure.

17. The aircraft propulsion system according to claim 9, wherein the duct includes a bypass closure, and wherein the controller is configured to increase the ratio by adjusting a degree of opening of the bypass closure.

* * * * *